C. D. SEEBERGER.
CONVEYER.
APPLICATION FILED JULY 15, 1907. RENEWED AUG. 19, 1910.
1,020,060.
Patented Mar. 12, 1912.
3 SHEETS—SHEET 1.
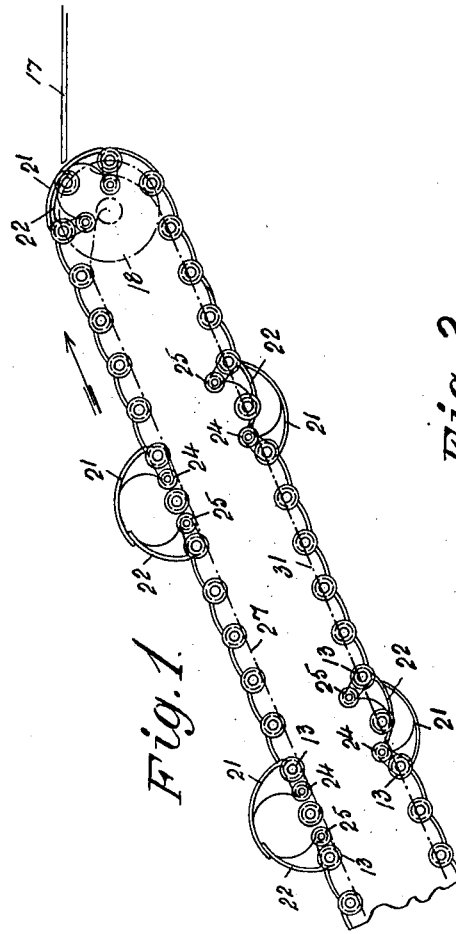
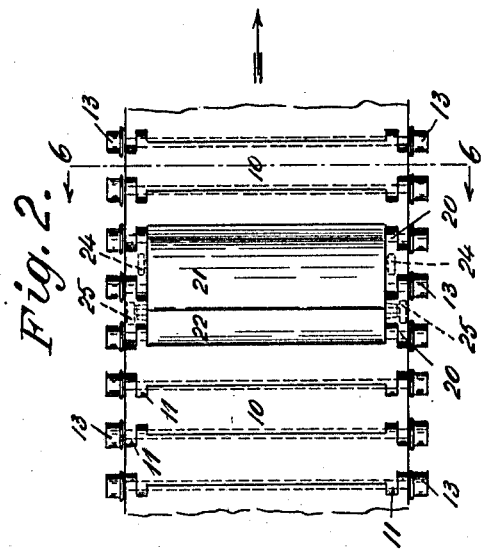
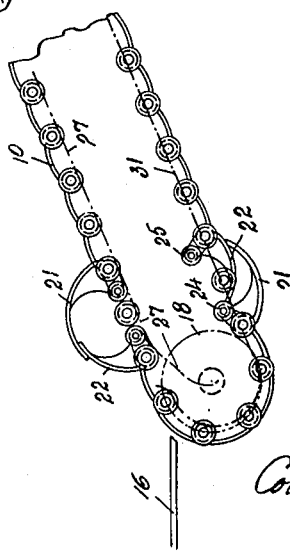
WITNESSES:
INVENTOR

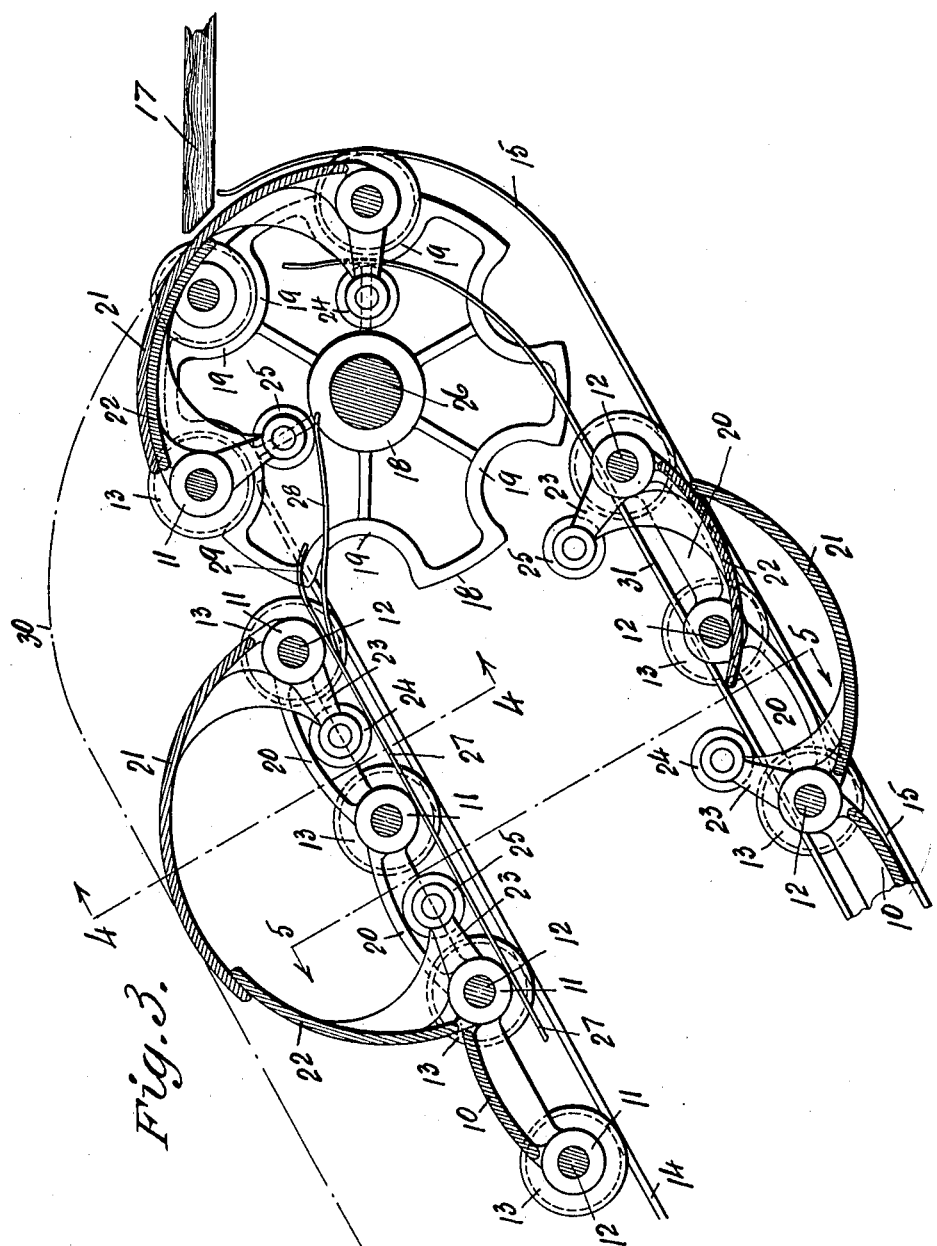

C. D. SEEBERGER.
CONVEYER.
APPLICATION FILED JULY 15, 1907. RENEWED AUG. 19, 1910.

1,020,060.

Patented Mar. 12, 1912.

3 SHEETS—SHEET 3.

UNITED STATES PATENT OFFICE.

CHARLES D. SEEBERGER, OF NEW YORK, N. Y., ASSIGNOR TO OTIS ELEVATOR COMPANY, A CORPORATION OF NEW JERSEY.

CONVEYER.

1,020,060.  Specification of Letters Patent. Patented Mar. 12, 1912.

Application filed July 15, 1907, Serial No. 383,828. Renewed August 19, 1910. Serial No. 577,995.

*To all whom it may concern:*

Be it known that I, CHARLES D. SEEBERGER, a citizen of the United States, residing at New York, in the county of New York and State of New York, have invented certain new and useful Improvements in Conveyers, of which the following is a specification, reference being had therein to the accompanying drawings.

My invention relates to conveyers, and especially to that class of conveyers wherein a traveling carrier or foot-way moves in an inclined run to transport passengers or freight between different levels.

The object of the invention is to provide certain novel and useful features in this class or type of machines, and especially with respect to forming a rest or barrier on the transporting run against which the merchandise may rest or upon which the passengers may stand.

The invention consists in the constructions, arrangements and organizations of parts hereinafter set forth and then pointed out in the appended claims.

Figure 4:
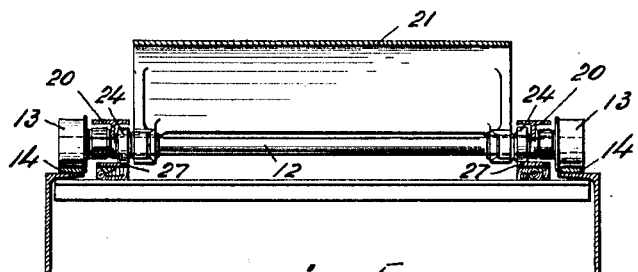
Figure 5:
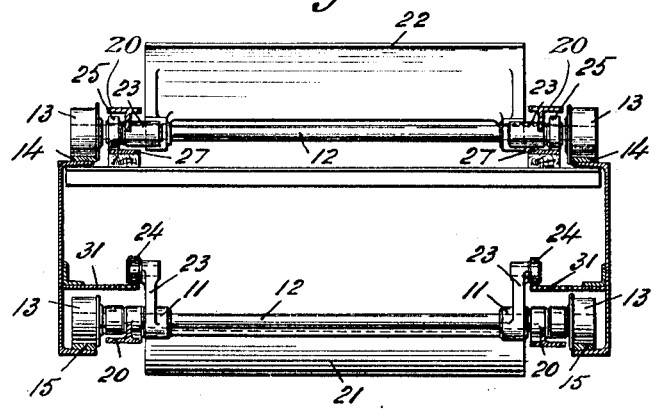
Figure 6:
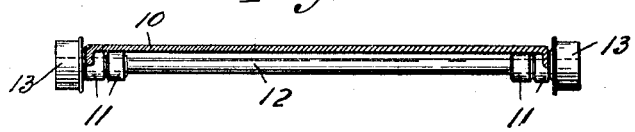

In the accompanying drawings illustrating the preferred embodiment of my present invention, Figure 1 is a diagrammatic view of a device illustrating the present invention; Fig. 2 is a top plan view of a portion of a conveyer showing a barrier and its associated parts; Fig. 3 is a sectional view taken at the upper end of the incline; Fig. 4 is a sectional view on the line 4—4 of Fig. 3; Fig. 5 is a sectional view on the line 5—5 of Fig. 3, and Fig. 6 is a sectional view on the line 6—6 of Fig. 2.

The machine comprises a conveyer preferably composed of a series of connected sections adapted to travel on suitable tracks between different levels to transport passengers or freight in either direction according to the direction of movement of the device. Each section 10 is rectangular in form and is provided with collars or bearings 11 adapted to loosely receive suitable axles 12 the alternate sections being cut away or recessed at the front and rear to receive the intermediate sections, and the ears of adjoining sections overlapping and being connected to common axles, as shown in Fig. 2. The axles are provided with wheels or travelers 13 adapted to run upon suitable tracks extending in upper and lower inclined runs or ways 14 and 15 between landings 16 and 17 at different levels, as shown in Fig. 1. The tracks terminate adjacent end carriages or reversers at different levels and which in the present form are shown as revolving spiders 18 preferably formed with seats 19 adapted to receive the wheels 13.

At predetermined intervals along the conveyer I provide abutments or rests against which merchandise or the wheels of trucks may lodge to safely hold the commodity upon the conveyer, and in the present embodiment these rests are constituted by sections of the conveyer capable of rising up somewhat above the normal line of the conveyer and presenting barriers or blocks on the transporting run. For this purpose certain of the sections are made in skeleton form consisting of end-pieces 20 connecting adjacent axles, and pivoted upon the axles between the end-pieces are suitable upwardly projecting plates or sections 21 preferably extending approximately the width of the conveyer, and adapted to stand above the line or plane to form barriers or abutments. In the preferred embodiment these barriers are curved toward the lower end of the device or toward the rear when considering the machine to run in the direction of the arrow on Fig. 1, and in order to provide a closure for each barrier a succeeding axle is provided with a similarly but reversely curved plate or section 22 whose free edge passes below and within the part 21.

In order to accommodate the device to the ordinary floor-landing, as at 17, and so that the latter need not be provided with any openings through which the special sections or barriers disappear, I make the latter in folding or knock-down form and also provide means to automatically collapse them at the upper landing. For this purpose the sections 21 and 22 are loosely mounted on their associated axles 12, and are provided with inwardly directed projections or arms 23 carrying suitable rollers 24 and 25, respectively, preferably one such arm and its roller at each end of each folding section. The tracks 14 terminate adjacent the spiders 18, which are arranged in pairs upon a suitable shaft 26 to which they are keyed and by which the machine may be driven from any suitable source of power.

Auxiliary tracks or ways 27 are provided inside the main or supporting tracks 14, and upon which the rollers 24 and 25 travel, the tracks 27 being so positioned as to hold the folding sections 21 and 22 open or in operative position while the latter travel on the transporting run, as shown in Fig. 3. The tracks 27 at their end are inside the spiders, and at a suitable point adjacent the upper carriage they slit or divide, the outer section 28 dipping or running off at an angle below the upper section 29 which continues in the same general plane of the track 27 for a short distance and then curves downwardly as shown in Fig. 3. The rollers 24 and 25 at each end are in different vertical planes as shown in Fig. 2, the planes of the rollers 24 being inside those of the rollers 25, and the rollers 24 coöperate with the curved sections 29 while the rollers 25 coöperate with the angular sections 28. When the barrier reaches the top of the inclined portion of the run or way, the rollers 25 pass down the angular track sections 28 and the rollers 24 pass around the curved track sections 29, so that the barrier-sections 21 and 22 fold down to the position shown at the extreme right of Fig. 3, the curve of the barrier-sections being struck upon the same radius as the circumference of the spiders. The dotted line 30 in Fig. 3 shows the general path of the sections 21. When the folding barriers pass around the spiders 18 the rollers 24 pass upon the return tracks 31 which hold the sections 21 from swinging upon their axles, the sections 22 then being held by the first sections as shown in Fig. 3. When the barriers pass around the lower end carriage at the lower end of the return run, the rollers 24 and 25 enter upon the lower end of the track 27 which opens them to operative position.

The present invention eliminates all openings and slots at the landings and enables a conveyer having barriers to coöperate with the ordinary floor-landing. For example, in conveyers employing upwardly projecting dogs or arms it is necessary to provide slots or openings at the landings through which the arms or dogs may pass; but with my invention all such openings are avoided and the attendant risks eliminated, as the barriers automatically fold or close down into the path of the carrier and so pass the ordinary floor landings.

It is of course obvious that the barriers are effective at different inclinations of the conveyer, and therefore this form of conveyer is especially applicable to docks or wharves where by reason of differences in tide levels the inclination of the conveyer varies; with the ordinary conveyer there are times of the tide when they cannot be used, as when at low tide the angle of inclination is less than the angle of repose of the commodity transported, but the present form may be used at steep inclines or angles as well as at lesser ones.

While the device is especially adapted for transporting freight, it may of course be used as a passenger conveyer, each of the barriers constituting in effect a step-section as the part 21 forms a tread surface, and the part 22 a riser.

While the sections or parts 21 may of course be utilized without the coöperating closures 22, I prefer in practice to employ the latter, as they complete the barriers and close all openings therein. While the barriers are specially useful in inclined conveyers, they may of course be utilized in conveyers traveling in a substantially horizontal path.

It is of course obvious that where a conveyer extends between three or more landings, as where it passes below one or more intermediate landings, the barriers may be lowered to the line of the conveyer at these intermediate landings by employing my present invention so that they will pass under the intermediate landings and reappear beyond them to again serve as rests upon the run to the next landing. In this arrangement the conveyer would be utilized for service between adjacent landings, and not for through service between alternate or non-adjacent landings.

Having described my invention what I claim as new and desire to secure by Letters Patent of the United States is:—

1. In a device of the class described, a conveyer, a plurality of barriers thereon normally standing above the plane of the conveyer, and means at the terminal to lower the barriers.

2. In a device of the class described, a conveyer traveling in an inclined path or way between different levels, a plurality of barriers thereon normally standing above the plane of the conveyer, and means at the top of the incline to lower the barriers.

3. In a device of the class described, a conveyer consisting of a connected series of sections traveling in an inclined path or way between different levels, a series of barriers comprising pivoted sections, means to hold the barriers in elevation upon the incline, and means to lower the barriers when they reach the top of the incline.

4. In a device of the class described, a conveyer consisting of a connected series of sections traveling in an inclined path between different levels, certain of the sections being pivotally mounted, means to elevate the pivoted sections above the plane of the other sections on the incline, and means to lower the pivoted sections into the path of the other sections at the top of the incline.

5. In a device of the class described, a conveyer traveling in an inclined path between different levels, a series of barriers pivotally mounted on the conveyer, means to elevate the barriers above the plane of the conveyer on the incline, and means to lower the sections into the path of the conveyer at the top of the incline.

6. In a device of the class described, a conveyer consisting of a series of sections, axles connecting adjacent sections and having wheels adapted to travel on inclined tracks extending between different levels, barriers pivotally mounted on certain of the axles, projections on the barriers, tracks with which the projections co-act to hold the barriers in elevation on the incline and to lower the barriers into the path of the conveyer at the top of the incline.

7. In a device of the class described, a conveyer consisting of a series of sections, axles connecting adjacent sections and having wheels adapted to travel on inclined tracks extending between different levels, barriers pivotally mounted on certain of the axles, projections on the barriers, tracks on the incline with which the projections co-act to elevate the barriers and having curved portions to lower the barriers into the plane of the conveyer at the top of the incline.

8. In a device of the class described, a plurality of folding barriers normally elevated above the plane of the conveyer and means to fold the barrier at the terminal.

9. In a device of the class described, a plurality of barriers each consisting of a pair of telescoping plates, means to elevate the plates above the conveyer on the transporting run, and means to telescope the plates into the line of the conveyer at the terminal.

10. In a device of the class described, a conveyer, a curved end-carriage therefor, a plurality of barriers each consisting of a pair of opposite plates curved to correspond with the curve of the end-carriage, means to elevate the plates above the conveyer on the transporting run, and means to interfold the plates at the end-carriage.

11. In a device of the class described, a conveyer consisting of a series of sections, axles connecting adjacent sections and having wheels adapted to travel on inclined tracks extending between different levels, barriers each consisting of an oppositely pivoted pair of overlapping curved plates having inwardly extending arms, a curved reverser or end-carriage, tracks with which the arms coöperate to open the plates on the incline and having deflected portions at or near the reverser to close the plates at the landing.

12. In a device of the class described, a conveyer consisting of a series of sections, axles connecting adjacent sections and having wheels adapted to travel on inclined tracks extending between different levels, a reverser at the exit level comprising a pair of connected spiders, a pair of overlapping curved plates pivoted upon upper and lower axles, inwardly projecting arms on the plates and arranged in different vertical planes, and a track on the incline with which the arms co-act, the track at or near the reverser having a downwardly projecting portion for the arm of the rear plate and a curved portion for the arm of the front plate.

13. In a device of the class described, a conveyer traveling between different levels in an inclined path, a plurality of barriers on the conveyer, means at one level to raise the barriers above the line of the conveyer, and means at the other level to lower the barriers into the line of the conveyer.

14. In a device of the class described, a conveyer traveling between landings, the exit landing being at the end of the conveyer and comprising a plane-faced platform or floor section, barriers on the conveyer standing above its line on the transporting run, and means to lower the barriers to the line of the conveyer at the exit landing.

15. In a device of the class described, a conveyer, a plurality of barriers thereon normally standing above the plane of the conveyer, and means to lower the barriers at predetermined points.

In testimony whereof I affix my signature in presence of two witnesses.

CHARLES D. SEEBERGER.

Witnesses:
ELIZABETH MOLITOR,
J. McROBERTS.